United States Patent [19]
Goto et al.

[11] Patent Number: 5,093,175
[45] Date of Patent: Mar. 3, 1992

[54] INTEGRALLY FOAMED ARTICLE HAVING THREEFOLD-LAMINATED COVER MATERIAL

[75] Inventors: Fumio Goto; Taro Ogawa, both of Kurashiki, Japan

[73] Assignee: Namba Press Works Co., Ltd., Kurashiki, Japan

[21] Appl. No.: 445,633

[22] PCT Filed: Mar. 10, 1989

[86] PCT No.: PCT/JP89/00265
§ 371 Date: Dec. 28, 1989
§ 102(e) Date: Dec. 28, 1989

[87] PCT Pub. No.: WO89/08550
PCT Pub. Date: Sep. 21, 1989

[30] Foreign Application Priority Data
Mar. 10, 1988 [JP] Japan ................. 63-54996

[51] Int. Cl.$^5$ .............................. B32B 3/26
[52] U.S. Cl. ........................... 428/71; 428/76; 428/315.5; 428/315.9; 428/316.6
[58] Field of Search ......... 428/71, 76, 315.5, 315.7, 428/315.9, 316.6

[56] References Cited
U.S. PATENT DOCUMENTS 3,130,505  4/1964  Markevitch .......... 428/315.5
4,520,517  6/1985  Ahlm ................... 428/316.6
4,824,719  4/1989  Creyf et al. .......... 428/316.6

Primary Examiner—William J. Van Balen
Attorney, Agent, or Firm—Renner, Kenner, Greive, Bobak, Taylor & Weber

[57] ABSTRACT

An integrally foamed article comprises a threefold-laminated cover material and a body foam bonded together thereto. The threefold-laminated cover material is preliminarily configured into a substantially closed hollow shape corresponding to a desired final contour into which a foamable mixture such as reactive polyurethane stock is poured and allowed to foam and expand to adhere integrally therewith without any penetration into said cover material. The threefold-laminated cover material is composed of an outermost permeable cover fabric such as knitted or woven fabric, an intermediate thin foam layer bonded to the inside of said fabric, and an innermost shielding film such as polyvinyl chloride or polyurethane film formed therein with a number of minute air holes permitting gases and air to be passed therethrough, but not permitting said foamable mixture to enter. The shielding film is strongly bonded to the inside of said intermediate thin foam layer, and not only assures excellent fluidity of the foamable mixture poured therein due to its smoothness, but also prevents penetration of said foamable mixture into said intermediate layer and cover fabric so as to ensure production of formed article, particularly of thin thickness, having uniform resiliency and softness and comfortable touch.

8 Claims, 2 Drawing Sheets

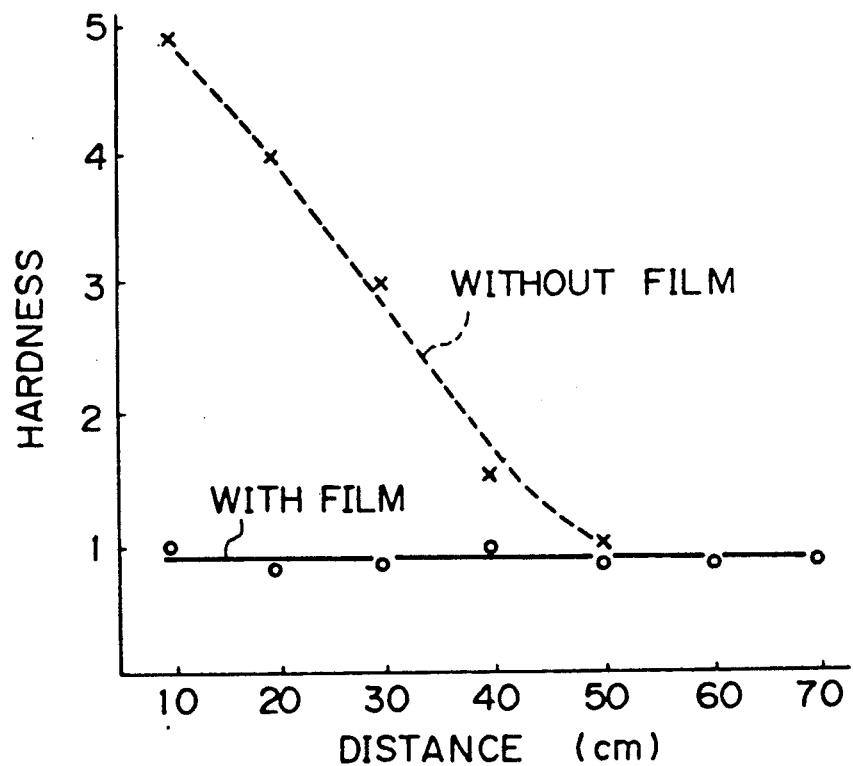
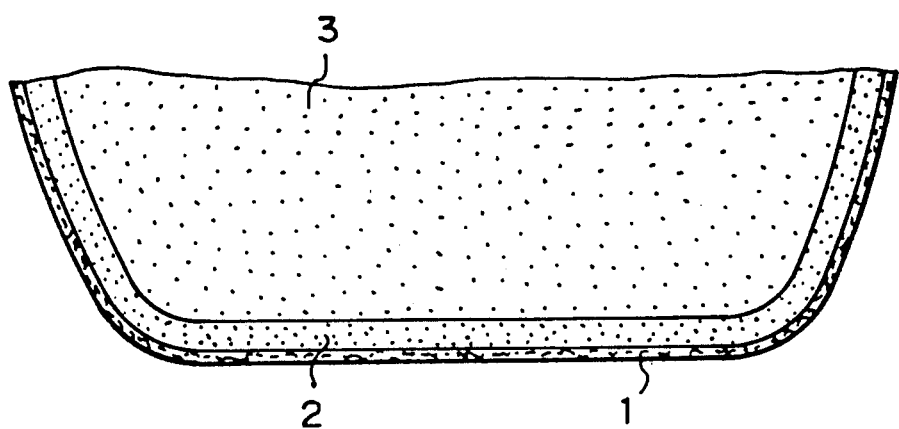

INTEGRALLY FOAMED ARTICLE HAVING THREEFOLD-LAMINATED COVER MATERIAL

TECHNICAL FIELD

This invention relates to an integrally foamed article having a threefold-laminated cover material, and more particularly to an integrally foamed article covered and enclosed by a threefold-laminated cover material, which is composed of an outermost permeable cover fabric, an intermediate slab foam and an innermost shielding film. An integrally foamed article of the invention can be applied to various products including vehicle seats, seat cushions, headrests, stuffed toys or dolls, and the like.

BACKGROUND ART

There is a well known process for manufacturing an integrally foamed article including:

a) providing a permeable cover fabric, b) configuring the permeable fabric into a substantially closed configuration which is substantially corresponding to a final contour of a desired final product, and c) pouring a liquid foamable mixture such as liquid polyurethane mixture into said closed configuration causing the mixture to foam and expand in situ and to be integral with the interior surface of said cover fabric. In this instance, the cover fabric must be of permeable nature in order to expell gases produced during foaming of the mixture and air entrapped inside the cover fabric.

The permeable cover fabric, however, has many drawbacks in that the liquid foamable mixture poured onto the inner surface of the cover fabric penetrates into the cover fabric itself and leaks out of the cover fabric so that any cured and hardened spots or areas are formed locally on the surface of the fabric to spoil the appearance of the final product, to make stiffened touch on the surface of the foamed article, and to lower quality of the foamed article. To avoid these defects, French patent No. 2,470,566 to Societe Industrielle Bertrand Faure, Jan. 13, 1984 discloses a relief method as illustrated in FIG. 5 of the attached drawings. In this method, permeable fabric 1 of natural or synthetic fibers and thin layer of synthetic foam 2 adhered thereto compose a cover material into which highly catalyzed reactive polyurethane stock is directly poured while it is still in the flowable state though it begins its chemical reaction so as to foam and expand to form a body foam 3. It is said in this French patent that the body foam 3 penetrates slightly into the thin foam 2 to form a "superficial layer" which provides strong bonding between the body 3 and the thin layer 2, yet allowing the layer 2 to be permeable, and the "superficial layer" never reaches the cover fabric 1 nor causes locally stiffened areas to be produced therein.

According to the above French patent, the "superficial layer" is formed by the fact that the poured mixture, while rapidly changing from liquid state to creamy state, penetrates only "superficially" into the thin foam 2 to form "stiffened layer" sufficiently hardened to assure good bonding between the foam body 3 and the thin foam 2.

Thus, the French patent alleges that it can obviate such problems heretofore encountered in the integrally foamed product by direct pouring method as leaking out of foamable mixture through cover fabric, stiffened touch and spoiled appearance of the resultant product.

It is noted, however, that the existence of said stiffened "superficial layer" between the body foam and the thin foam layer of the product actually provides stiff and uncomfortable touch when one contacts or presses the outer surface of the product in an actual use thereof.

Another problem resides in that poured creamy foamable mixture penetrates partially into the thin foam layer 2 to cause flow resistance to the poured material to be larger and fluidity of the material to be lowered. Thus, the teachings in the aforementioned French patent is not suited particularly to manufacturing of thin foamed products because the foamable material poured into a relatively thin or restricted space hardly flows therethrough to reach eventually the overall length of the product to be formed so that defective portions may occur not attaining prescribed thickness of foam.

Furthermore, the foamable material poured into relatively thin spaces suffers from larger flow resistance so that it foams and expands insufficiently in the area near the pouring site and presents over-charged conditions and increased hardness due to high density thereat, which results in undesirable foamed products of non-uniform resiliency.

DISCLOSURE OF THE INVENTION

Accordingly, it is an object of the present invention to provide an integrally foamed product of uniform resiliency and comfortable touch without any locally stiffened spots throughout the entire surface of the final product.

It is another object of the invention to provide an integrally foamed article which can result from liquid or creamy foamable composition of unobstructed fluidity, and has a predetermined amount of foamed body properly distributed throughout the entire portions of the final product.

It is yet another object of the invention to provide an integrally foamed article which is relatively thin and yet has predetermined correct thickness and substantially uniform resiliency throughout the entire portions thereof.

These and other objects of the invention are accomplished by (1) providing a threefold-laminated cover material composed of an outermost permeable cover fabric, an intermediate slab foam such as polyurethane thin foam bonded to the inside surface of the fabric as by adhesives and an innermost shielding film with minute air holes such as polyurethane or polyvinyl chloride films also bonded as by adhesives to the inside surface of the slab foam, (2) configuring said threefold-laminated cover material into a closed shape substantially corresponding to that of a desired final product such, for example, as headrests or seat cushions, and (3) pouring a liquid or creamy foamable mixture directly into said shaped cover material to make a foamed body integrally bonded to the inside surface of said shielding film.

The shielding film utilizable in the present invention should be selected from the material having good smoothness to aid in good flowing of the poured foamable mixture and also ability to strongly adhere to the cured body foam, and preferably may be polyurethane or polyvinyl chloride films. Also, the shielding film has a number of air holes formed therein which are minute enough to prevent poured foamable mixtures from penetrating into intermediate slab foams and yet to allow gases from the foaming material to be passed through the intermediate slab and the permeable fabric to the air.

The foamable mixture utilizable in the present invention includes compositions which are in liquid or creamy states at the time of pouring into the cover material, and preferably may be highly reactive polyurethane composition.

An advantageous feature of the present invention resides in that, due to the existence of the innermost shielding film capable of allowing gases and air to pass therethrough, but not permitting foamable compositions to pass, the latter is completely prevented from penetrating into the intermediate slab layer and no stiffened layer in any sense is permitted to occur at the interface between the body foam and the slab layer. Thus, the integrally foamed article according to the present invention can have truly resilient and comfortable touch of the body foam itself when contacted from the outside of the article in contrast to the prior art product such as French patent which is uncomfortable in sensing the stiffened layer existing between the cover fabric and the body foam.

Likewise, in accordance with the present invention, due to the existence of the innermost shielding film having excellent smoothness, the foamable composition poured thereon can exhibit far more excellent fluidity than those having to flow directly over the slab foam layer. Accordingly, the foamable liquid or creamy composition poured onto the shielding film can enter smoothly and extensively the thin or restricted spaces without being obstructed in any way thereby to yield desired foamed articles having body foam of prescribed thickness and density properly distributed throughout the entire length. Furthermore, due to excellent fluidity, the foamable composition poured onto the shielding film can spread over the entire portions of the intended article rapidly, i.e., before it completes substantial degrees of foaming reaction and, therefore, it undergoes substantially concurrently and uniformly foaming and expanding processes throughout the entire portions of the article to yield uniform extent of foaming and hardness throughout the article.

BRIEF DESCRIPTION OF THE DRAWINGS

FIG. 3 is a graph showing test results conducted on foamed articles of the invention (with film) and the control (without film) with the abscissa indicating distances attained by foamable compositions before completing their foaming and expanding, and the ordinate indicating hardness of foamed bodies at various distances;

FIG. 5 shows a partial sectional view of an integrally foamed article of the prior art.

BEST MODE FOR CARRYING OUT THE INVENTION

Figure 1:
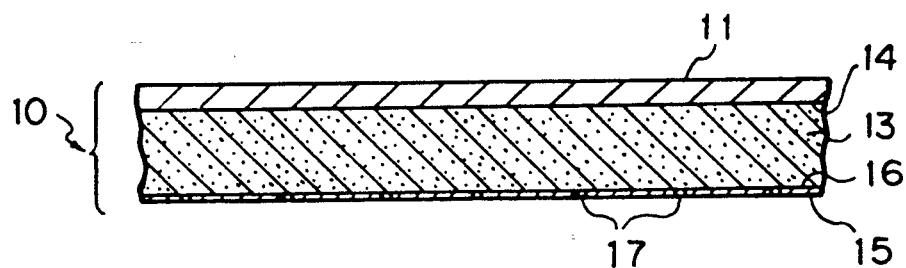
FIG. 1 illustrates a threefold-laminated cover material utilizable to manufacture an integrally foamed article of the present invention in a fragmentary enlarged sectional view.

Referring now to the drawings, preferred embodiments of the present invention will be specifically described.

In FIG. 1, a threefold-laminated cover material 10 according to the present invention is illustrated in fragmentary enlarged sectional view. The cover material 10 has a permeable cover fabric 11 such as knitted or woven fabric, and a slab foam 13 such as soft polyurethane foam bonded to the inner side of the fabric 11 at an interface 14. The slab foam 13 serves to produce soft feelings or resilient touch on the surface of the final product as well as to discharge gases produced during foaming reaction as will be discussed hereinafter. Preferably, slab foam 13 is of a few millimeters or more in thickness. To the slab foam 13 is bonded a shielding film 15 at the interface 16.

The shielding film 15 may be polyurethane film of 40-100 microns thick, or polyvinyl chloride film of 50-500 microns thick. These films are formed with a number of air holes 17 minute enough to allow gases and air to pass therethrough, but prevent liquid or creamy foamable composition such as reactive polyurethane stock from passing therethrough. Where voluminous foamable compositions are to be involved, i.e., large amount of gases are produced during foaming process, it is desirable that a correspondingly large number of air holes 17 be formed in the film 15.

The shielding film 15 with fine air holes 17 is of excellent smoothness to assist excellent flowability of foamable composition poured thereon as will be understood from FIG. 3 explained below, and also of ability of being strongly adhered to foamed polyurethane resulting from the poured composition.

The threefold-laminated cover material 10 of the present invention described above is subjected to a shaping process wherein it is shaped into a substantially closed configuration corresponding to a final contour of a desired final product, and then receives therein a foamable mixture such as foamable polyurethane stock poured directly into said closed configuration to provide an integrally foamed article.

Figure 2:
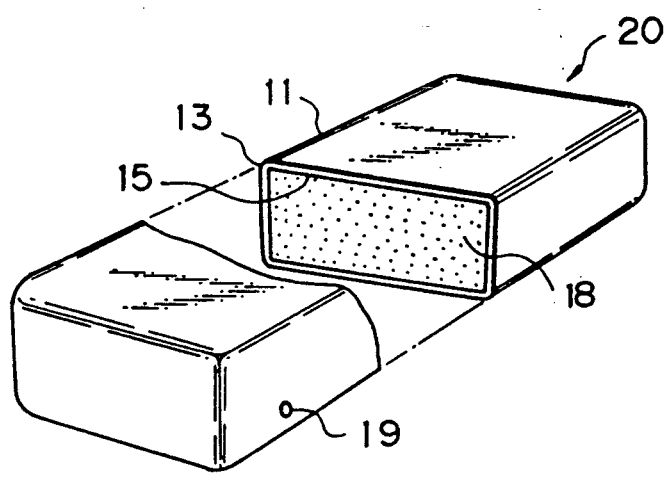
FIG. 2 shows a perspective view of an armrest as an example of a relatively thin article according to the present invention with a portion cut out.

Such article is illustrated in FIG. 2 as an armrest 20 with a portion thereof cut away to show clearly the interior structure. The cover fabric 11 has the slab foam 13 bonded to its inner surface as a backing permeable layer to the inside of which the shielding film 15 with minute air holes is bonded to complete the laminated three-layer material 10. This material is shaped into the contour of the final product, i.e., rectangular armrest in this instance, as by sewing or welder techniques. Into this shaped material is poured foamable mixture in liquid or creamy states which foams and expand in situ to form a foamed body 18 of the article 20. For pouring the mixture, an appropriate injecting means (not shown) is inserted as through a spot 19 into the shaped material. When a predetermined amount of the foamable mixture is poured into the shaped material, the injecting means is removed therefrom. After that, pierced spot 19 will recover and close naturally due to the resilient nature of the fabric 11, and yet it is preferable to place the inserting spot 19 at any hidden site on the final product.

The foamed body 18 upon completely expanded adheres to the shielding film 15 strongly and will not be peeled off therefrom in the usual usage of the article.

TABLE I below represents test results concerning bonding strength between the foamed body and the shielding film. In this test, threefold-laminated cover materials were used comprising a jersey as the cover fabric commercially available under the tradename "Polykral", soft polyurethane foam of 2 mm thick as the slab foam, and polyurethane or polyvinyl chloride films as listed in TABLE I as the shielding film with minute pinholes.

TABLE I

| Type of Shielding Films (Thickness) Breaking load** | Bonding Strength of Shielding Films | | |
|---|---|---|---|
| | polyurethane (100μ) | PVC (470μ) | |
| | | surface-processed* | non-processed |
| Run 1 | 0.55[2] | 0.54[1] | 0.30[1] |
| Run 2 | 0.60[2] | 0.50[1] | 0.15[1] |
| Run 3 | 0.62[2] | 0.60[2] | 0.31[1] |
| Run 4 | 0.57[2] | 0.56[2] | 0.25[1] |
| Run 5 | 0.64[2] | 0.58[2] | 0.21[1] |
| Average | 0.60 | 0.56 | 0.24 |

*Film surfaces were processed with acrylic primers.
**Breaking load in Kg/25 mm (90° peel off)
[1]Numerals with suffix[1] indicates breaking occurred at the interface between the shielding film and the body foam.
[2]Numerals with suffix[2] indicates breaking of the body foam itself with no peeling occurred at the interface.

As seen from TABLE I, the threefold-laminated cover material of the present invention has excellent bonding strength between the innermost shielding film and the foamed body, and polyurethane shielding films and processed PVC are found to be particularly suited to manufacturing of integrally foamed articles with minimum peeling off of the films. In these test runs, any traces of "stiffened layer" resulting from the poured foamable mixtures passing through minute air holes in the shielding films were not noted anywhere.

Figure 4:
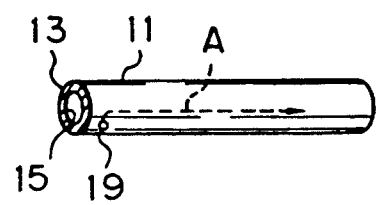
FIG. 4 illustrates in a perspective view a pipe made of the cover material used in the comparative test in FIG. 3.

Now referring to FIGS. 3 and 4, smoothness of the shielding films of the invention will be explained in relation to a test conducted using the cover material in the form of a pipe as shown in FIG. 4 of the size of 37 mm outer diameter and 30 mm inner diameter. Two types of pipes were prepared, one being of the threefold-laminated cover material of the invention and the other of the prior art fabric with backing foam layer and without shielding film. The pipe represented in FIG. 4 was made of the threefold-laminated material of the invention with cover fabric 11, slab foam 13 of 2 mm thick and shielding film 15. Similar pipes were made of the prior art fabric as controls without shielding films. Both pipes with films and without films were tested by inserting an injection nozzle (not shown) through a spot 19 into the inside, pouring through the nozzle an amount of foamable polyurethane mixture, allowing the mixture to foam and expand while flowing in the direction of an arrow A, and measuring the distances from the spot 19 to the location reached by foamed mixtures and hardness of the foamed polyurethane at various distances.

FIG. 3 depicts the results of such comparative test in which the ordinate represents hardness of the foamed polyurethane measured by "Aska C" durometer and the abscissa shows distance (cm) attained by foamed polyurethane. A curve of broken line depicts measurings for the controls and the solid line indicates measured values for the threefold-laminated cover material of the invention.

As viewed from FIG. 3, foamed articles using the control fabric (without the shielding film) produce too hardened portions adjacent to the injection point (19) and rapidly decreasing hardness along the distance from the injection point. Further, foaming stock in the control could only reach at maximum the 50 cm point from the injection point. In contrast, foamed articles using the threefold-laminated material of the invention could reach the 70 cm point from the injection point (17% longer) on the basis of the same amount of poured stock as the control and yet the hardness of foam is substantially uniform throughout the entire length and of low level (soft touch). Thus, the present invention can advantageously present foamed articles of soft or resilient nature and of substantially uniform hardness throughout the entire portions thereof, particularly for relatively thin articles.

INDUSTRIAL APPLICABILITY

In accordance with the present invention, the integrally foamed article can be prepared which is covered by the threefold-laminated cover material having at its inner side the shielding film with minute air holes allowing gases and air to be well discharged during foaming processes in the same manner as the conventional permeable fabric. By employment of the shielding film, the foamable mixture poured thereon can be increasingly improved in its fluidity so that it can flow through far more long distance while in the initial stage of foaming process. Thus, even where relatively thin article is to be produced, integrally foaming technique can be utilized to form a desired article having prescribed uniform thickness throughout the entire extent.

Further beneficial feature of the invention resides in that the film can prevent completely the body foam to enter the backing slab foam layer so as to avoid possibilities of forming "stiffened layer" which otherwise would render the final product uncomfortable in touch. Prevention of "stiffened layer" makes it possible to use cover fabrics of high grade resiliency in manufacturing integrally foamed articles without losing its own characteristics of softness and comfortable feelings.

Further, the shielding film of the present invention has been proved not to cause peeling off or separation of cover materials from the body foam under the usual conditions of use in contradiction to alleged effect of "stiffened layer" in the abovementioned French patent to act as strong bonding layer between the body foam and the cover fabric.

We claim:

1. An integrally foamed article comprising:
   a threefold-laminated cover material composed of an outermost permeable cover fabric, an intermediate thin foam layer bonded to the inside surface of said cover fabric and an innermost shielding film having a number of minute air holes formed therein and bonded to the insided of said intermediate thin foam, said threefold-laminated cover material being configured into a shape substantially corresponding to a desired final contour of the article, and
   a body foam resulting from a foamable mixture poured in a liquid or creamy state into said configured cover material and bonded integrally with said shielding film, without any stiffened layers formed between said body foam and said intermediate thin foam layer.

2. An integrally foamed article as claimed in claim 1 wherein said permeable cover fabric is knitted or woven fabric made of natural or synthetic fibers.

3. An integrally foamed article as claimed in claim 1 wherein said intermediate thin foam layer is a soft polyurethane foam of about 2-10 mm thickness.

4. An integrally foamed article as claimed in claim 1 wherein said shielding film is selected from polyurethane film or polyvinyl chloride film.

5. An integrally foamed article as claimed in claim 4 wherein said shielding film is a polyvinyl chloride film surface-processed so as to improve its bonding property with said body foam.

6. An integrally foamed article as claimed in claim 1 wherein said foamable mixture is a reactive polyurethane stock.

7. An integrally foamed article as claimed in claim 1 wherein said cover fabric is a jersey fabric to the inside of which is adhered a soft polyurethane foam of 2 mm thick as the intermediate layer, to the inside of which polyurethane film formed with minute air holes not permitting said body foam to pass therethrough is adhered as the shielding film, said body foam and said shielding film being bonded together integrally with each other in foaming process.

8. An integrally foamed article as claimed in claim 7 wherein said body foam is of relatively thin thickness.

* * * * *